Feb. 14, 1956     E. O. JOHNSON     2,735,061
INVERTER CIRCUITS
Filed Oct. 31, 1952

INVENTOR.
EDWARD O. JOHNSON
BY *Morris L. Rabkin*
ATTORNEY

United States Patent Office 2,735,061
Patented Feb. 14, 1956

2,735,061
INVERTER CIRCUITS

Edward O. Johnson, Princeton, N. J., assignor, by mesne assignments, to the United States of America as represented by the Secretary of the Army Application October 31, 1952, Serial No. 317,961

10 Claims. (Cl. 321—36)

This invention relates to inverter circuits of the type used to convert D.-C. electrical energy into A.-C. electrical energy, and more particularly to novel inverter circuits employing gas tubes. While not specifically related thereto, the inverter circuits of the present invention are particularly applicable for converting efficiently the low, D.-C. voltage supplies in automobiles, airplanes and tanks into relatively high A.-C. voltages.

The main source of D.-C. voltage in automobiles, airplanes and tanks is a battery having a voltage output range from about 6 volts to about 28 volts. It is often necessary to convert this relatively low unidirectional voltage into an alternating voltage in order to operate certain types of equipment requiring an A.-C. voltage input, as for instance 110 volts A.-C. Inverter circuits employing thyratron tubes have been used to obtain the desired conversion of A.-C. power to D.-C. power. A serious objection, however, to the use of inverter circuits employing thyratron tubes is the fact that the efficiency of these circuits is relatively low because of the power loss resulting from the relatively large voltage drop across the thyratron tubes when they are conducting.

If a thyratron inverter circuit is used to convert a unidirectional voltage of 28 volts, for example, into an A.-C. voltage, it can be shown that the maximum tube efficiency will be $100(1-10/28)=64$ percent, where the arc drop across the thyratron tube is 10 volts. In a copending application of the present inventor, E. O. Johnson, Serial No. 185,745, filed September 20, 1950, and assigned to the assignee of the present invention, there is described and claimed a gaseous electron tube in which the function of supplying energy to provide a space charge neutralizing plasma and the function of providing a field to draw work current are separated. Since the arc drop across the latter gaseous tube is in the neighborhood of two volts when it is conducting, it can be shown that the maximum efficiency of this type of tube will be $100(1-2/28)=93$ per cent. It is, therefore, apparent that the efficiency of an inverter circuit using gas tubes is approximately inversely proportional to the voltage drop across the tube while it is conducting other things being equal.

It is, therefore, an important object of the present invention to provide novel and highly efficient inverter circuits employing gas tubes of the type described.

It is a further object of the present invention to provide improved inverter circuits, employing gas type tubes, particularly adapted to convert a low unidirectional voltage into a relatively higher A.-C. voltage, with a minimum power loss in the tubes.

It is still a further object of the present invention to provide novel inverter circuits, of the parallel-circuit type, employing gaseous tubes of the type described, which are simple and positive in operation, and highly efficient in use. These and further objects of the present invention are attained in inverter circuits employing gaseous discharge tubes of the type described, wherein the working function and the ionization function of the tubes are separated. In one embodiment of the present invention, a pair of gaseous tubes each having an anode, a grid, a main cathode, an auxiliary cathode, and a garrote or constricting electrode are connected in a parallel-type inverter circuit. Means are provided to cause the tubes to fire alternately, that is, in a cyclical order. The moment one tube is fired, a negative-going voltage derived from the output of the other gaseous tube is fed back to the auxiliary cathode of the tube that is firing. The difference in potential between the main and the auxiliary cathodes of the tube that is firing is sufficient to provide an ionization discharge. As a result of this fed back voltage, the plasma resulting from the ionizing discharge, produces a relatively low voltage drop across the anode and main cathode of the tube. This voltage drop is in the neighborhood of about one or two volts. In another embodiment of the present invention, the fed back voltage is derived from the secondary of an output transformer. The novel features of the invention as well as the invention itself, both as to its organization and method of operation will be understood better from the following description when taken in connection with the accompanying drawings in which similar reference numerals refer to similar elements, and in which:

Figure 1:
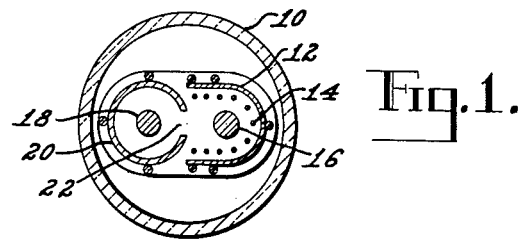
Fig. 1 is a cross-sectional view of a gas tube utilized in the embodiments of the invention.

Referring now to Fig. 1, there is shown a cross-sectional view of a gas tube utilized in the present invention. A tube envelope 10 contains a U-shaped anode 12 of sheet metal which is disposed externally to and in juxtaposed position with a control grid 14 having relatively coarse spacing. A main cathode 16 is maintained within and partially surrounded by the control grid 14 of the anode 12. An auxiliary cathode 18, laterally spaced from the main cathode 16, is maintained coaxially with respect to a slotted cylindrical restricting electrode, or garrote 20. An elongated, narrow slot 22 in the constricting electrode 20 extends along a plane through the axes of the auxiliary and main cathodes. This structure permits the desired degree of ionization to be obtained between the auxiliary and main cathodes with a considerable minimization of power required to sustain ionization within the tube. The anode 12 and the main cathode 16 of the tube provide the load circuit through which load currents can be passed in the manner of conventional tubes. These load currents may be controlled by the potential applied to the control grid 14. The auxiliary cathode 18 is an additional electrode for cooperation with the anode 12 and/or the main cathode 16 to provide for the ionization of the gas in the tube. The envelope 10 is filled with an ionizable gas, such as helium.

This gaseous electron tube is completely shown, described and claimed in the copending application by E. O. Johnson. Ionization or breakdown of the gas occurs between the auxiliary cathode and the main cathode and/or the anode of the tube. There is thus provided within the gas envelope a plasma which acts as an excellent conductor and which provides a low resistance connection between the anode and the main cathode of the tube. The density of the plasma generated in the tube is controlled at least in part by the amount of current flowing through the ionization circuit. Accordingly, the effective resistance between the main cathode 16 and the anode 12 may be controlled effectively by controlling the current flow in the ionization circuit. Alternately, the load current may be controlled by the potential applied to the control grid 14 interposed between the main cathode and the anode. The characteristics of the type of gaseous tube utilized are such that a relatively small change in the ionization current is effective to produce a relatively large change in the load circuit.

Figure 2:
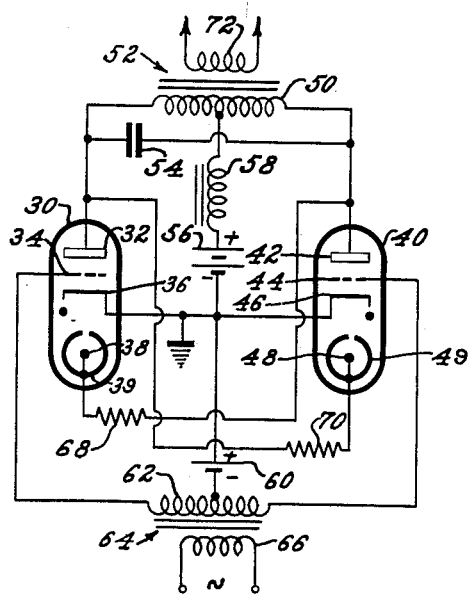
Fig. 2 is a circuit diagram of an inverter circuit in accordance with one preferred embodiment of the present invention.

Referring now to Fig. 2 of the drawings, there is shown a circuit diagram of a parallel-type inverter system in accordance with the present invention employing two gaseous electron tubes 30, 40 connected in parallel. The tubes 30, 40 are of the type described above. The tubes 30, 40 comprise, respectively, anodes 32, 42, grids 34, 44, main cathodes 36, 46, auxiliary cathodes 38, 48 and constricting electrodes or garrotes 39, 49. The anodes 32, 42 of the tubes 30, 40 are connected to each other through the primary 50 of an output transformer 52. The anodes 32, 42 are also connected to each other through a commutating capacitor 54. The cathodes 36, 46 of the tubes 30, 40, respectively, are connected to each other and to a point of reference potential, such as ground. A source of unidirectional voltage 56 has its negative terminal connected to the cathodes 36, 46 of the tubes 30, 40, and its positive terminal connected to a center tap on the primary winding 50 of the output transformer 52 through a smoothing choke 58. The grids 34, 44 of the tubes 30, 40 are biased negatively with respect to the cathodes 36, 46, respectively, by means of a source of unidirectional voltage 60. The positive terminal of the voltage source 60 is connected to ground and the negative terminal is connected to a center tap on the secondary 62 of an input transformer 64. The grids 34, 44 of the tubes 30, 40 are connected to each other through the secondary winding 62. A source of alternating voltage (not shown) is applied across the primary 66 of the input transformer 64 in order to overcome the negative bias on the grids 34, 44 of the tubes 30, 40, respectively, and thereby to fire them cyclically. The auxiliary cathode 38 of the tube 30 is connected to the junction between the anode 42 of the tube 40, and an end of the primary winding 50, of the output transformer 52, through a current limiting resistor 68. The auxiliary cathode 48, of the tube 40, is connected to the junction between the anode 32, of the tube 30, and the other end of the primary winding 50, of the output transformer 52, through a current limiting resistor 70.

The operation of the inverter circuit illustrated in Fig. 2 will now be described. The unidirectional voltage source 56 represents a source of voltage to be converted into an A. C. voltage. An alternating voltage from any convenient, conventional source (not shown) is applied across the terminals of the primary winding 66 of the input transformer 64. Let it be assumed that the tube 40 is conducting current through its anode-main cathode circuit and that the tube 30 is in a non-conducting state. Let it be assumed further that the alternating input voltage across the primary 66 of the input transformer 64 is such as to produce a transformed positive voltage on the grid 34 of the tube 30, and a transformed negative voltage on the grid 44 of the tube 40. The transformed positive voltage is of sufficient magnitude to overcome the voltage of the source 60 and the tube 30 will suddenly start to conduct, and current will start to flow in its anode-main cathode circuit. Up to this point, the tube 30 is acting as an ordinary thyratron. As a result of the tube 30 suddenly becoming conductive, there is a voltage drop at its anode 32 with respect to its cathode 36. This voltage drop, or negative-going voltage, is applied to the anode 42 of the tube 40 through the commutating capacitor 54 and, consequently, the tube 40 ceases to conduct. The negative-going voltage at the anode 42 of the tube 40 is fed back to the auxiliary cathode 38 of the tube 30 through the current limiting resistor 68. There now exists a difference in potential between the auxiliary cathode 38 and the main cathode 36, of the tube 30, of sufficient magnitude to produce an ionization discharge of the gas within the tube 30. As a result of this ionization discharge, conduction between the anode 32 and the main cathode 36 of the tube 30 is greatly enhanced, and the voltage drop between the anode 32 and the cathode 36 of the tube 30 is lowered still further to the order of about one or two volts. It is noted that if the tube 30 were to act as a pure thyratron the voltage drop thereacross would be in the order of about 10 volts. It has been found that satisfactory results are obtained regardless of whether or not the constricting electrodes 39, 49 are connected to the auxiliary cathodes 38, 48 of the tubes 30, 40 respectively. The presence, however, of the constricting electrode, or garrote 39 is important since it causes a high efficiency of ionization.

The tube 30 will continue to conduct current until the input voltage to the primary 66 of the input transformer 64 produces a positive transformed voltage on the grid 44 of the tube 40. The tube 40 is then fired and the voltage at its anode 42 drops suddenly to approach that of its cathode 46. The latter drop in voltage is applied to the anode 32 of the tube 30 through the commutating capacitor 54, and consequently, the tube 30 ceases to conduct. The drop in voltage at the anode 32 of the tube 30 is fed back to the auxiliary cathode 48 of the tube 40, through the current limiting resistor 70. There now exists a difference in potential between the auxiliary cathode 48 and the main cathode 46, of the tube 40, of sufficient magnitude to produce an ionization discharge within the tube 40 such that the voltage drop across the anode-main cathode circuit is in the order of one or two volts. It is noted that the tubes 30, 40 are fired cyclically, and that one tube goes through the same chain of events as the other tube except that the operation of each tube is 180° out of phase with each other. When the tube 40 is conducting and the tube 30 has been cut off, the potential at the anode 32 of the tube 30 begins to rise at a rate determined by the circuit parameters comprising the capacitor 54, the smoothing choke coil 58, and the reflected load impedance in the primary 50 of the transformer 52. The two wave forms of anode potential at the anodes 32, 42 of the tubes 30, 40, respectively, are combined in the output transformer 52 so that a sine wave of good shape is produced in the secondary 72.

Figure 4:
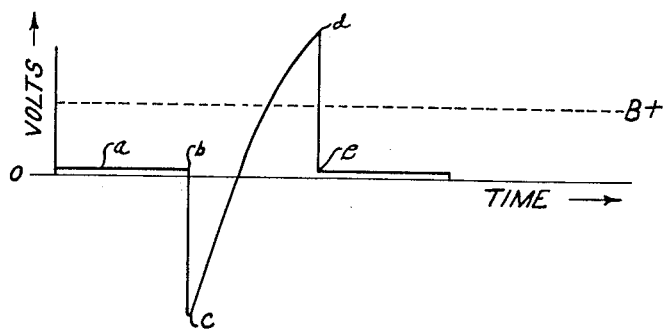
Fig. 4 is a graph used to explain the operation of the inverter circuits of the present invention.

A better understanding of the operation of the inverter circuit described and illustrated in Fig. 2 may be had by referring to Fig. 4. The curve of Fig. 4 represents the voltage at the anode of one of the gas tubes with respect to time. If it is assumed that the tube 30 is fired when the time equals zero, the portion $a$ of the curve represents the voltage at the anode 32 while the tube is firing. When the voltage on the grid 44 of the tube 40 fires the tube 40, the anode voltage at the anode 32 of the tube 30 drops from the point $b$ to the point $c$, and the tube 30 ceases to conduct. The potential at the anode 32 will now rise to the point $d$ at a rate determined by the circuit parameters comprising the constants of the capacitor 54, the smoothing choke 58, and the reflected load impedance in the primary 50 of the transformer 52. When the voltage on the grid 34 of the tube 30 fires the tube 30 again, the potential at its anode 32 will drop to the point $e$. This completes the cycle of the anode voltage 32 of the tube 30. The anode 42 of the tube 40 goes through the same chain of events except that it is 180° out of phase with the voltage at the anode 32 of the tube 30. The two wave forms of anode potential are combined in the output transformer 52 and a good sine wave appears in the secondary 72 of the output transformer 52.

Figure 3:
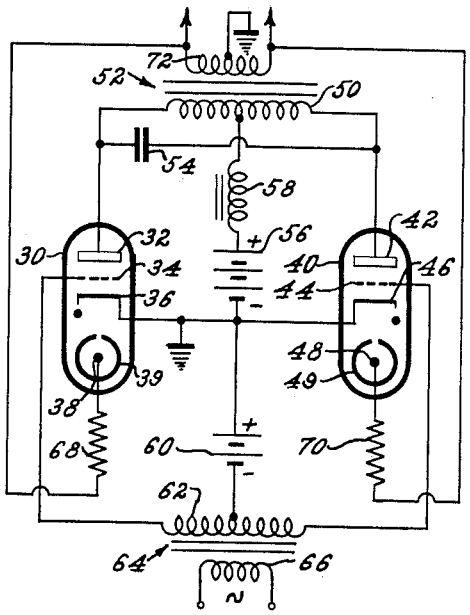
Fig. 3 is a circuit diagram of a modification of the circuit of Fig. 2.

There is shown in Fig. 3, an inverter circuit similar to the one described and illustrated in Fig. 2 except for the means for feeding back a voltage from the output transformer 52 to the auxiliary cathodes 38, 48 of the tubes 30, 40 respectively. In Fig. 3, the secondary winding 72 of the ouput transformer 52 has a center tap connected to ground, one end connected to the auxiliary cathode 38 of the tube 30, through the current limiting resistor 68, and the other end connected to the auxiliary cathode 48 of the tube 40, through the current limiting resistor 70. The secondary winding 72 is wound in a direction so that the voltage applied to the auxiliary cathodes will be negative-going only when the tubes in which they are contained are fired. The operation of the inverter circuit illustrated in Fig. 3 is the same as that illustrated in Fig. 2, the only difference being that the fed back voltages, to produce the ionization discharge are derived from points in the output voltage circuit which are different from those described and shown in Fig. 2.

There has been shown and described above, in accordance with the objects of the present invention, novel, useful and highly efficient inverter systems which employ gas tubes and which provide a high current, low impedance output. The efficiency of the inverter systems is extremely high because the circuits provide for means to produce an auxiliary discharge simultaneously with the firing of the gas tubes, whereby the power lost by the voltage drop across the gas tubes is reduced to a minimum. Since the inverter circuits described herein provide means to minimize the loss in the gas tubes, these circuits may be used efficiently to convert relatively low unidirectional voltage sources into A.-C. energy.

What is claimed is:

1. An inverter circuit comprising a pair of gas tubes each having an anode, a grid, a main cathode, an auxiliary cathode, and a constricting electrode surrounding a portion of said auxiliary cathode, output means connected in series with said anodes, means to apply a source of unidirectional voltage between the anode and main cathode of each tube, means to apply a source of alternating voltage to the grids of said tubes to fire said tubes cyclically, and means to feed back cyclically a voltage from said output means to the auxiliary cathode of each tube when it is being fired, said feed back means comprising connections from said output means to said auxiliary electrodes.

2. An inverter circuit comprising a pair of gas tubes each having an anode, a grid, a main cathode, an auxiliary cathode, and a constricting electrode surrounding a portion of said auxiliary cathode, said main cathodes being connected to each other, an output transformer, said anodes being connected to each other through said transformer, a capacitor connected between said anodes, means including said transformer to apply a source of unidirectional voltage between said anodes and said main cathodes, means to apply cyclically a source of alternating voltage coupled to the grids of said tubes to fire said tubes cyclically, and means including connections from said transformer to said auxiliary cathodes to feed back cyclically a negative going voltage to the auxiliary cathode of each tube when it is being fired.

3. An inverter circuit comprising a pair of gas tubes each having an anode, a grid, a main cathode, an auxiliary cathode, and a constricting electrode surrounding a portion of said auxiliary cathode, an output transformer having primary and secondary windings, said anodes being connected to each other through said primary winding, a capacitor connected between said anodes, said main cathodes being connected to each other, means including said secondary winding to apply a source of unidirectional voltage between said anodes and said main cathodes, means to apply an alternating voltage coupled to the grids of said tubes to fire said tubes cyclically, and voltage feed back means connected between the anode of one tube to the auxiliary cathode of the other tube.

4. An inverter circuit as defined in claim 3 wherein the auxiliary cathode and the constricting electrode within each tube are connected to each other.

5. An inverter circuit comprising a pair of gas tubes each having an anode, a grid, a main cathode, an auxiliary electrode, and a constricting electrode surrounding a portion of said auxiliary cathode, an output transformer having primary and secondary windings, one end of said secondary winding being connected to one of said anodes of one of said tubes, the other end of said secondary winding being connected to the anode of the other of said tubes, a capacitor connected between said anodes, means including said secondary winding to apply a source of unidirectional voltage between said anodes and said cathodes in each tube, alternating voltage means coupled to said grids to fire each of said tubes cyclically, and cross feed back means including direct coupling between said one end of said secondary winding and the auxiliary cathode of said other of said tubes, and direct coupling from said other end of said secondary winding to the auxiliary cathode of said one of said tubes.

6. An inverter circuit comprising a pair of gas tubes each having an anode, a grid, main cathode, an auxiliary cathode, and a constricting electrode surrounding a portion of said auxiliary cathode, an output transformer having primary and secondary windings, the anode of each tube being connected to said primary winding, means including said primary winding to apply a source of unidirectional voltage between said main cathode and said anode in each tube, a capacitor connected between said anodes, a source of alternating voltage means connected between the grids of said tubes to fire said tubes in cyclical order, and feed back connections between said secondary winding and said auxiliary cathodes to feed back a negative-going voltage to the auxiliary cathode of the tube being fired.

7. An inverter circuit comprising a pair of gas tubes each having an anode, a grid, a main cathode, an auxiliary cathode, and a constricting electrode surrounding a portion of said auxiliary cathode, an output transformer having primary and secondary windings, the anode of each tube being coupled to said primary winding, means including said primary winding to apply a source of unidirectional voltage between said main cathodes and said anodes, a capacitor connected between said anodes, a source of alternating voltage means connected between the grids of said tubes to fire said tubes in cyclical order, a center tap on said secondary winding, a source of reference potential connected to said center tap and to said main cathodes, said auxiliary cathodes being connected to each other through said secondary winding, said secondary winding being wound in a direction to feed back a negative-going voltage to the auxiliary cathode of the tube being fired, whereby an ionization discharge is produced between the auxiliary cathode and the main cathode of the tube being fired.

8. In a parallel inverter circuit of the type used to convert a unidirectional voltage source into a source of alternating voltage, employing a first and a second gas tube each having an anode-main cathode circuit including said uni-directional voltage source, means including a grid in each tube to fire said tubes cyclically, a capacitor connected between the anodes of said tubes, and output means coupled to said anodes to derive said alternating voltage; the improvement comprising an auxiliary cathode and a constricting electrode surrounding a portion of said auxiliary cathode in each tube, and feed back means connecting said output means to said auxiliary cathodes to provide cyclically a negative-going voltage to each auxiliary cathode when the respective tube in which it is contained is being fired.

9. A parallel inverter circuit of the type defined in claim 8 wherein said feedback means comprises a connection from the anode of said first tube to the auxiliary cathode of said second tube, and a connection from the anode of said second tube to the auxiliary cathode of said first tube.

10. A parallel inverter circuit of the type defined in claim 8 wherein said output means comprises an output transformer having a primary winding in series with said anodes, and a secondary winding, and said feedback means includes said secondary winding connected in series with said auxiliary cathodes.

References Cited in the file of this patent

UNITED STATES PATENTS

| | | |
|---|---|---|
| 2,284,389 | Hansen | May 26, 1942 |
| 2,456,754 | Sziklai | Dec. 21, 1948 |